(12) United States Patent
Breiter et al.

(10) Patent No.: US 8,001,429 B2
(45) Date of Patent: Aug. 16, 2011

(54) METHOD AND SYSTEM FOR AUTOMATED HANDLING OF ERRORS IN EXECUTION OF SYSTEM MANAGEMENT FLOWS CONSISTING OF SYSTEM MANAGEMENT TASKS

(75) Inventors: Gerd Breiter, Wildberg (DE); Ruediger Maas, Boelingen (DE); Steffen Rost, Nufringen (DE); Thomas Spatzier, Schoenzich (DE)

(73) Assignee: International Business Machines Corporation, Armonk, NY (US)

( * ) Notice: Subject to any disclaimer, the term of this patent is extended or adjusted under 35 U.S.C. 154(b) by 533 days.

(21) Appl. No.: 11/859,078

(22) Filed: Sep. 21, 2007

(65) Prior Publication Data
US 2008/0244337 A1    Oct. 2, 2008

(30) Foreign Application Priority Data
Sep. 25, 2006   (EP) ..................... 06121216

(51) Int. Cl.
*G06F 11/00* (2006.01)
*G06F 9/46* (2006.01)
(52) U.S. Cl. ........ 714/48; 705/7.27; 705/7.13; 717/104; 718/108
(58) Field of Classification Search .................. 705/8, 9; 709/203
See application file for complete search history.

(56) References Cited

U.S. PATENT DOCUMENTS

| | | | | |
|---|---|---|---|---|
| 7,065,493 | B1* | 6/2006 | Homsi ............................... | 705/8 |
| 2003/0200527 | A1* | 10/2003 | Lynn et al. .................... | 717/102 |
| 2004/0019512 | A1* | 1/2004 | Nonaka ............................. | 705/8 |
| 2004/0083448 | A1* | 4/2004 | Schulz et al. .................. | 717/101 |
| 2005/0154735 | A1* | 7/2005 | Breh et al. ....................... | 707/10 |
| 2007/0156487 | A1* | 7/2007 | Sanabria et al. .................. | 705/8 |
| 2007/0245357 | A1* | 10/2007 | Breiter et al. .................. | 719/320 |
| 2009/0006172 | A1* | 1/2009 | Singh et al. ........................ | 705/9 |

OTHER PUBLICATIONS

Lou, "Exception Handling in Workflow Systems", 2000, Isdis.cs.uga.edu, p. 125-147.*
Casati, "Specification and Implementation of Exceptions in Workflow Management Systems", 2000, ACM, p. 405-451.*
IBM, "Exploring Storage Management Efficiencies and Provisioning", 2004, IBM, p. 1-252.*

* cited by examiner

*Primary Examiner* — Robert Beausoliel
*Assistant Examiner* — Jeison C Arcos
(74) *Attorney, Agent, or Firm* — Cantor Colburn LLP; William A. Kinnaman, Jr.

(57) ABSTRACT

A method and system for automated error handling in system management flows by enhancing workflow engines by an error handling component and by adding a supportive error handling layer to invoked system management tasks which serves as the counterpart to the workflow engine's error handling component. The additional functionality of the task-provided error handling layer is accessible for the workflow engine via extended Web services interfaces. The workflow engine's error handling component and the task-provided error handling layer allow for the definition of a standard protocol between the workflow engine and invoked tasks for automated error handling. Furthermore, an interface and method of communication between the enhanced workflow engine and an external error resolving device (such as an expert system) is defined with the purpose of using the external error resolving device for automatic error recovery. The internal or external error resolving device is capable of performing corrective actions on the managed IT infrastructure using mechanisms outside the scope of this invention. The benefit of the presented architecture is that the complexity concerning error handling is completely removed from system management flow definitions, and the designer of a system management flow can concentrate on the logical structure of the flow (e.g. the correct sequence of tasks).

18 Claims, 5 Drawing Sheets

METHOD AND SYSTEM FOR AUTOMATED HANDLING OF ERRORS IN EXECUTION OF SYSTEM MANAGEMENT FLOWS CONSISTING OF SYSTEM MANAGEMENT TASKS

CROSS-REFERENCE TO RELATED APPLICATION

This application claims the priority benefit under 35 U.S.C. §119 of European application 06121216.3, filed Sep. 25, 2006, and incorporated herein by reference.

BACKGROUND OF THE INVENTION

1. Field of the Invention

The present invention relates to executions of system management flows, and in particular to a method and system for automated handling of errors in execution of system management flows consisting of system management tasks.

2. Description of the Related Art

The present invention is concerned with the management of complex IT infrastructures (1) consisting of distributed heterogeneous resources (see FIG. 1). The management of such IT infrastructures is—in most cases—done by performing a number of system management tasks (tasks) in a certain sequence an order to reach a certain management goal. Such a sequence of system management tasks is called a system management flow (2) within this invention.

Each task in a system management flow fulfils a certain sub-goal within the overall flow and thus contributes to the overall goal of the complete system management flow. System management tasks (10-12) are provided by system management applications (e.g. Tivoli Provisioning Manager, Tivoli System Automation etc.) and can be leveraged to perform certain actions on the managed IT infrastructure (1). For example, tasks (10-12) provided by Tivoli Provisioning Manager can be used to provision new resources to an IT infrastructure (1).

In order to allow integration into a management flow, the tasks (10-12) provide standards-based Web services interfaces (13-15) via which tasks get invoked (20) during the execution of a system management flow.

From an architectural perspective, system management flow (2) in FIG. 1 is primarily a logical flow description that arranges the single tasks according to their dependencies among each other. That is, a task N might depend on the result of a task N−1, and yet another task N+1 can only be executed if task N has finished.

In order to get executed, such a logical system management flow has to be converted (encoded) into a detailed flow definition that can be executed by a workflow engine (19). Typically, such a detailed flow definition contains the following items for each task (e.g. task 3) defined in the logical system, management flow: invoke the task via its Web services interface; wait for the response; analyze and process the response. A commonly used standard for the detailed flow definitions is the Business Process Execution Language (BPEL).

While the logical system, management flow (2) is a mostly straight-forward definition of a certain sequence of tasks, the detailed flow definition (e.g. written in BPEL) can become very complex as soon as it comes to the handling of errors that can occur in single system management tasks. Errors that occur during runtime have to be resolved before the next system management task can be executed. The way in which errors are handled has to be explicitly defined within the detailed flow definition.

Moreover, system management tasks invoked by a system management flow often contain a number of internal substeps (e.g. task 2; 16-18). For complete error handling it is necessary to explicitly react to each potential error that can occur in sub-steps in the system management flow definition resulting in very complex constructs (4) for the invocation of one logical system management task (3). An error-aware definition for the invocation of a multi-step system management task would, for example, include the following items:

(5) invoke the system management task;
(6) check the result of the task; in ease of an error try to find out which sub-step failed;
(7) depending on which sub-step failed performs a certain, sequence of corrective actions and try to re-run the task in order to achieve the task's goal.

As just explained, for performing error handling in system management flows it is necessary to explicitly include error handling instructions into flow definitions. That is, it is not sufficient to just define the logical sequence of system management task invocations, but instructions have to be included for handling each error that can potentially occur during the execution of tasks in the system management flow.

In addition to defining complex error-aware flow definitions (4) to correct errors in single tasks, there is a necessity to provide complete alternate flow definitions for non-recoverable errors.

Consequently, system management flow definitions can become very complex and the designer of the flow cannot just define the simple logical structure of the flow.

Detailed knowledge about the internal structure of invoked system management tasks and about possible corrective actions is necessary so define correct error handling instructions within system management flow definitions.

The reasons for the mentioned deficiencies are twofold. On the one hand, workflow engines executing detailed flow definitions are primarily just interpreting and executing flows defined in a flow definition language (e.g. BPEL) and do not include any automatic mechanisms for handling errors. Every step to be done has to be explicitly defined within the flow definitions. On the other hand, there is no sophisticated communication between the workflow engine and invoked tasks other than the invoke call and the response call returned by the invoked task. That is, there is a lack of communication (the lack of a certain protocol) concerning the handling of errors.

SUMMARY OF THE INVENTION

It is an object of the present invention to provide a method and system for automated handling of errors in execution of system management flows consisting of management tasks avoiding the disadvantages of the prior art.

The present invention provides a method and system for automated handling of errors in execution of system management flows by enhancing workflow engines (30) by a standard error handling component (40) and by adding a supportive error handling layer (60, 80, 90) to invoked system management tasks which serves as the counterpart to the workflow engine's error handling component (see FIG. 2). The additional functionality of the task-provided error handling layer (60, 80, 90) is accessible for the workflow engine via extended Web services interfaces (61, 81, 91). The workflow engine error handling component (40) and the task-provided error handling layer allow for the definition of a standard protocol between the workflow engine and invoked tasks (31) for automated error handling.

Furthermore, an interface and method of communication (32) between the enhanced workflow engine and an external error resolving device (33) (such as an expert system) is defined with the purpose of using the external error resolving device for automatic error recovery. The external error resolving device is capable of performing corrective actions on the managed IT infrastructure using mechanisms (34) outside the scope of this invention.

The benefit of the presented architecture is that the complexity concerning error handling is completely removed from system management flow definitions, and the designer of a system management flow can concentrate on the logical structure of the flow (e.g. the correct sequence of tasks).

As a result, the designer of a system, management flow just has to define the optimistic ("good case") flow (35) and the handling of errors is automatically performed by the proposed system without the need to explicitly define error handling directives in flow definitions. The flow designer just has to define occurrences of task invocations (36) within flow definitions.

BRIEF DESCRIPTION OF THE DRAWINGS

The present invention is illustrated by way of example and is not limited by the shape of the Figures of the drawings in which.

DESCRIPTION OF THE PREFERRED EMBODIMENTS

In the following a detailed description of the inventive error handling architecture including structure and operation of the workflow engine's error handling component (40) and of the task-provided error handling layer (60, 80, 90) as well as the interaction between both components will be described.

Error Handling Component of Workflow Engine

Figure 3:
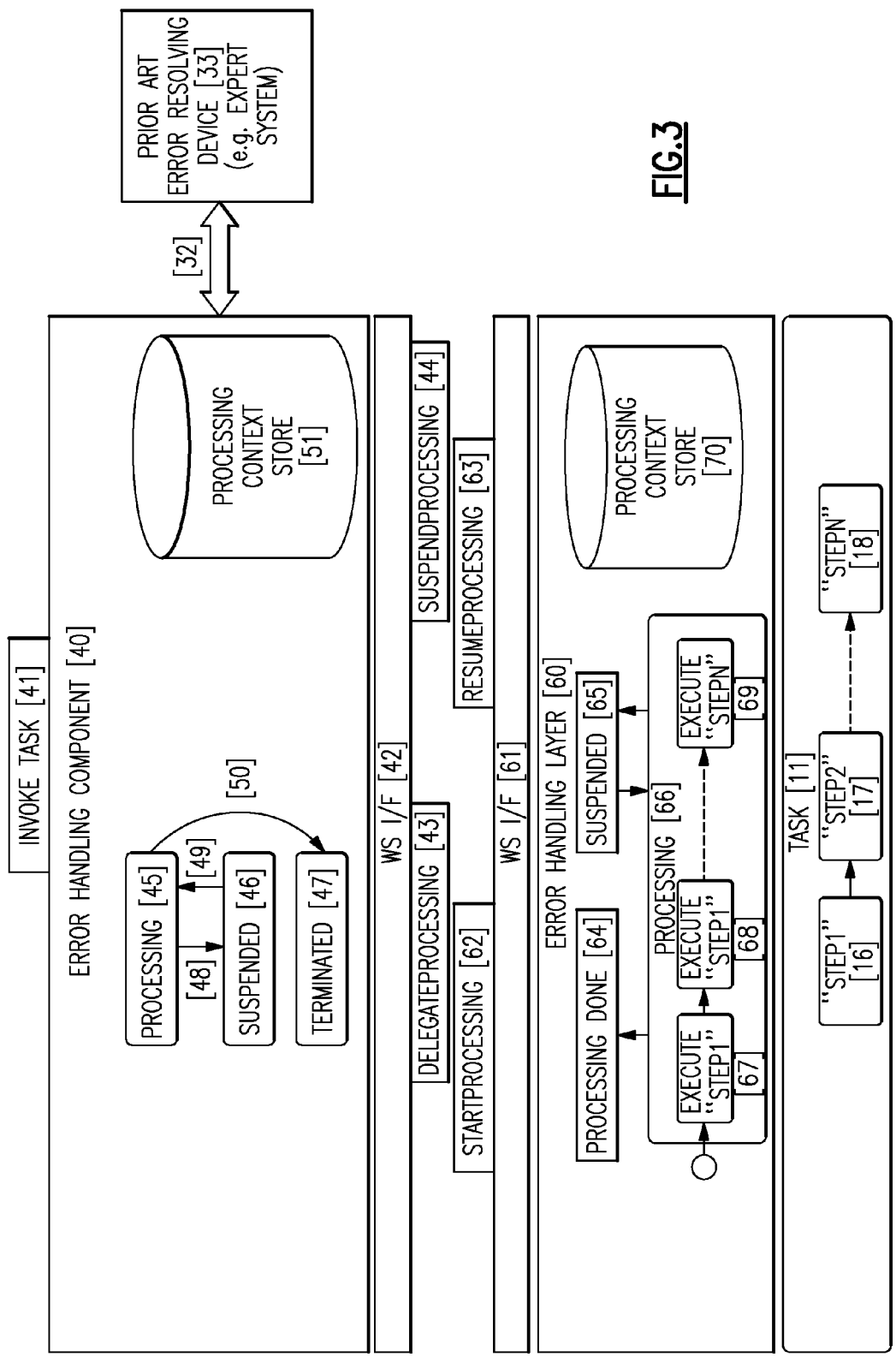
FIG. 3 shows details of the inventive error handling architecture.
Figure 4:
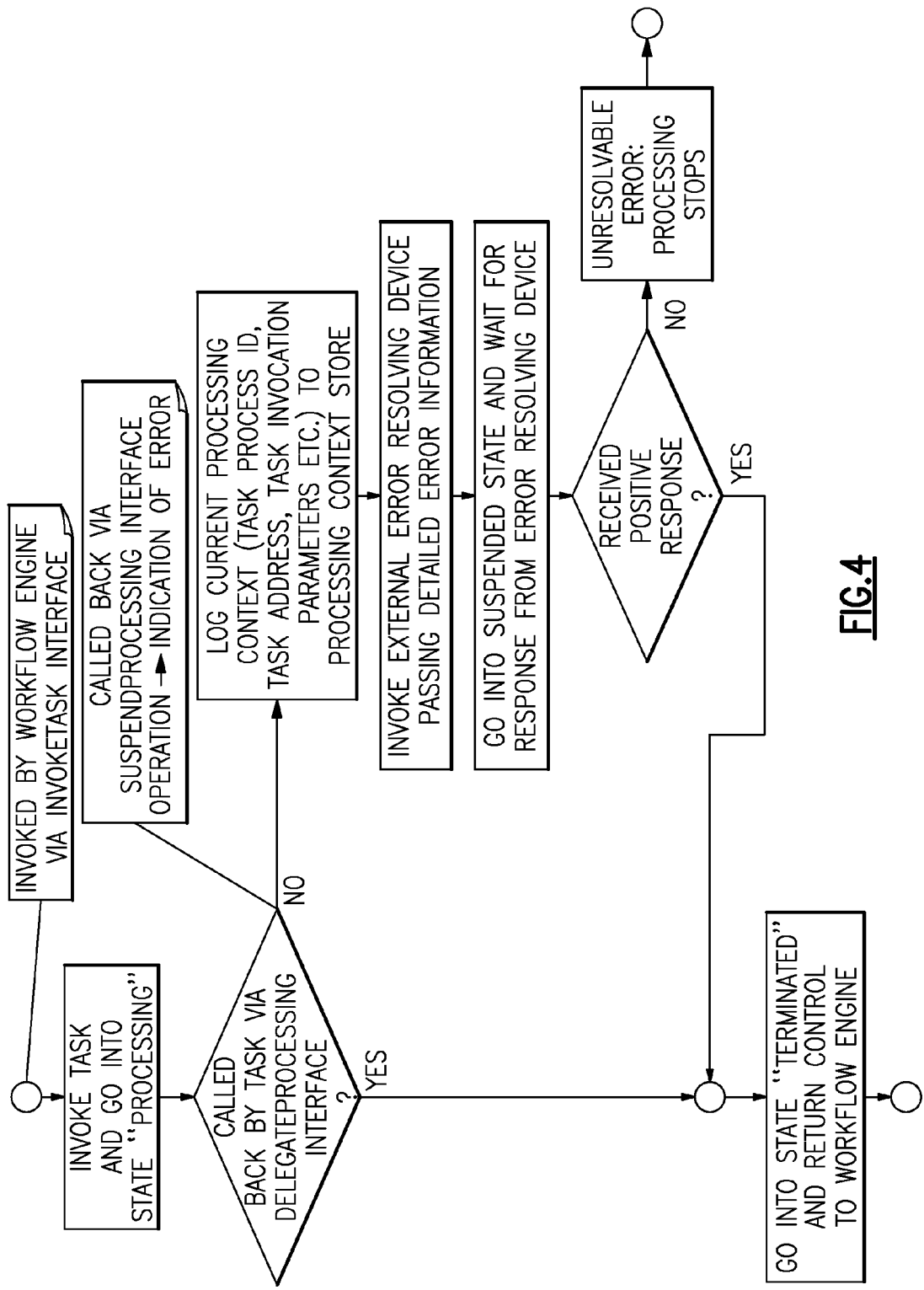
FIG. 4 shows the process flow of the error handling component which is part of the inventive error handling architecture.

The processing flow of the error handling component is described in more detail with respect to FIGS. 3 and 4.

Error handling component (40) is a component within the enhanced workflow engine (30) that adds implicit error handling support to the workflow engine. This component actually adds a layer of indirection between a normal (prior art) workflow engine and the tasks invoked by the workflow engine. Each time the workflow engine invokes a task defined in the flow definition (35) in FIG. 2 this call is intercepted by error handling component (40); the workflow engine's call to invoke the task is redirected to the error handling component's "invoke task" interface (invokeTask) (41; see FIG. 3) and the error handling component then actually invokes the respective task via a Web service call to the task's "start processing" interface (startProcessing) operation (62). As soon as the invoked task has finished processing, the task calls back the workflow engine's error handling component via a "delegate processing" interface (delegateProcessing) operation (43). Control is then given back to the normal workflow engine by the error handling component. The workflow engine can now go on processing the flow defined in flow definition (35) in FIG. 2.

While processing tasks of the system management flow (35) error handling component (40) builds up a set of records for the current flow in its processing context store database (51). When being invoked by the workflow engine via the invokeTask interface (41) a record gets created that processing of task N of the system management flow has started. Whenever a task completes (error handling component (40) is invoked via interface operation delegateProcessing (43)), the task is marked as completed.

One task, record in the processing context store database (51) includes the unique ID of the flow a task belongs to and a unique ID for me task itself. The unique flow ID is used to correlate records for all tasks that belong to the same flow. This makes it possible for the error handling component (40) to cope with multiple parallel flows that get executed by the workflow engine. Furthermore, one record in the processing context store database (51) contains information about the actual task (11) being invoked by the error handling component (40), including e.g. the Web service address of the task's Web service interface (61) or the task's process ID. This information is used e.g. for resuming processing of a task (see below).

During processing one task, i.e. between the time the error handling component (40) is invoked via invokeTask (41) and the time control is given back to the workflow engine, processing within error handling component (40) follows a state model.

The normal state is state "processing" (45) meaning that the current task has been invoked and is currently processing normally. If an error occurs within the invoked task, the task signals the error condition (including a detailed error description) to error handling component (40) via a "suspend processing" interface (suspendProcessing) operation (44).

When receiving an error indication via interface operation suspendProcessing (44) the external error resolving device (33) is invoked via interface/protocol (32) passing the detailed error information received from the current task to that device in the fonts of a formal description of the error (see below). Then error handling component (40) goes (48) into the "suspended" state (46). Communication between the error handling component (40) and the external error resolving device (33) can be mapped to the respective flow and task via the flow and task ID stored in the processing context store.

Error resolving device (33) analyzes the formal error description received from error handling component (40) and tries to resolve the error condition. Typically, such a formal error description contains the following items: an identifier of the device (within IT infrastructure 1) where the error occurred, an identifier of the detected type of error, and additional parameters depending or the kind of error that further describe the error condition.

A preferred embodiment of error resolving device (33) could be a knowledge base, in which possible corrective actions for all kinds of errors are stored. From this knowledge base, error resolving device (33) can then look up the right solution based on the error identifier and failing device identifier and perform the necessary corrective actions on the managed IT infrastructure (1). Another preferred embodiment of error resolving device (33) could be an expert system, which can resolve errors based on the information passed in the formal error description and based on knowledge of the failing device and its relationships to other devices. A more detailed description of knowledge bases or expert system is outside the scope of this invention and is covered by existing prior art.

Figure 1:
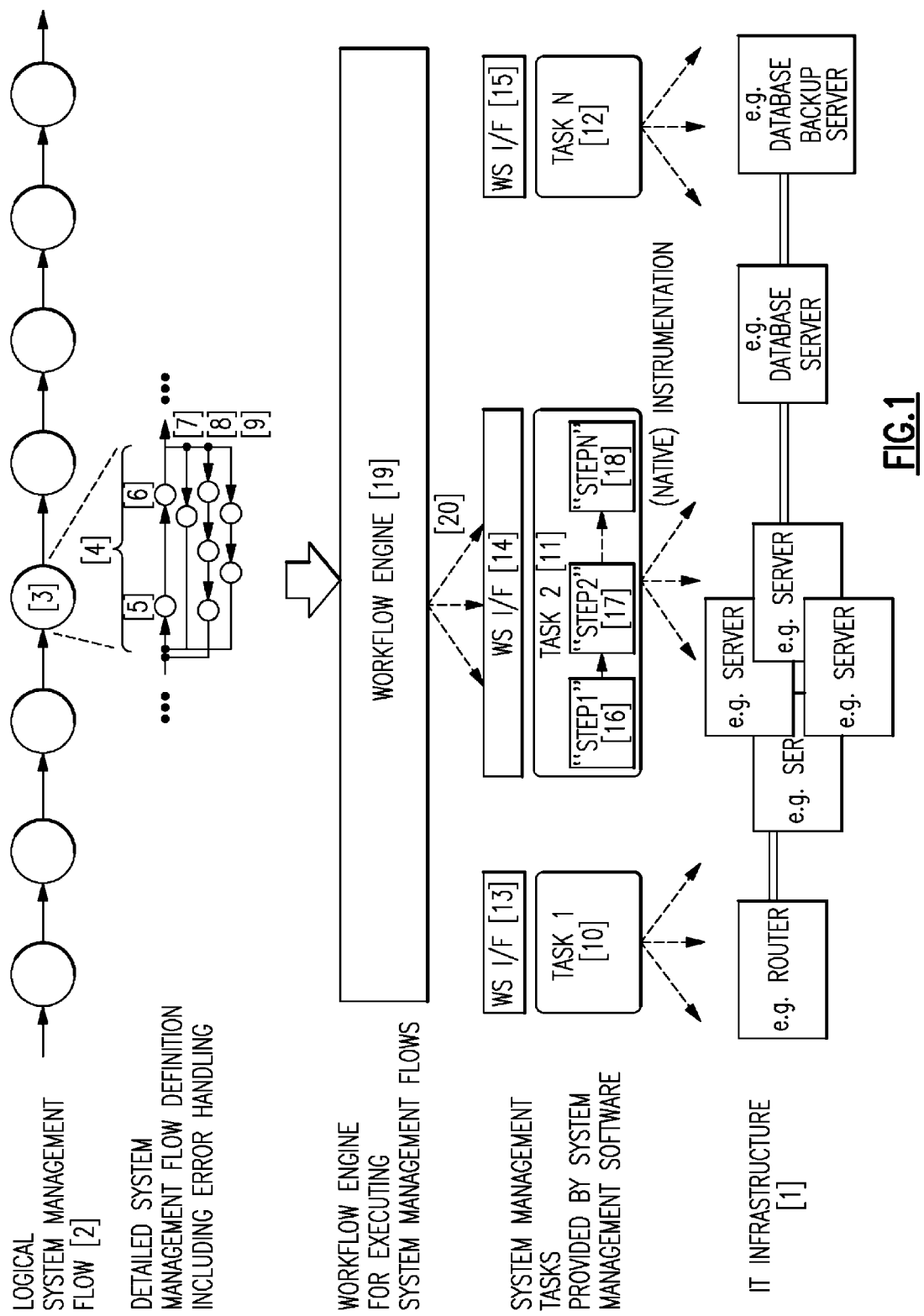
FIG. 1 shows the technical field and the prior art.
Figure 2:
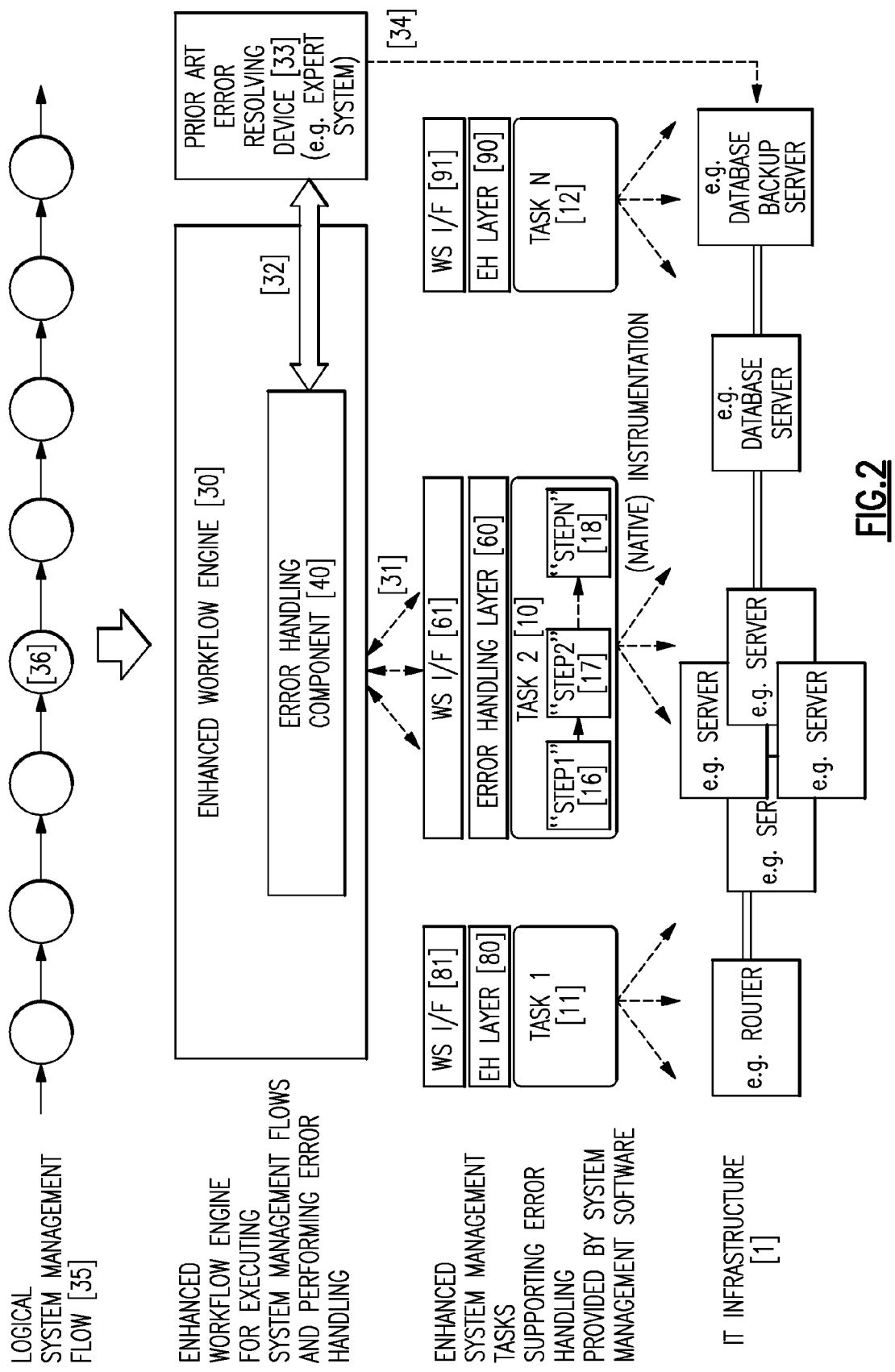
FIG. 2 shows inventive error handling architecture in an IT-infrastructure.

Error resolving device (33) may be implemented both as an external system component as depicted in FIG. 2, or it may be implemented as an integral part of the enhanced workflow engine (30).

As soon as the error has been resolved this is indicated to error handling component (40). As part of the indication message, the IDs of the flow and task that previously failed are passed to the error handling component from the processing context store (51) the error handling component (40) can then retrieve information about the current task (e.g. Web service address of she task's Web service interface). The task is then invoked via its "resume processing" interface (resumeProcessing) operation (63) and the error handling component (40) goes (49) into the "processing" state (45) again.

Error Handling Layer of Tasks

Figure 5:
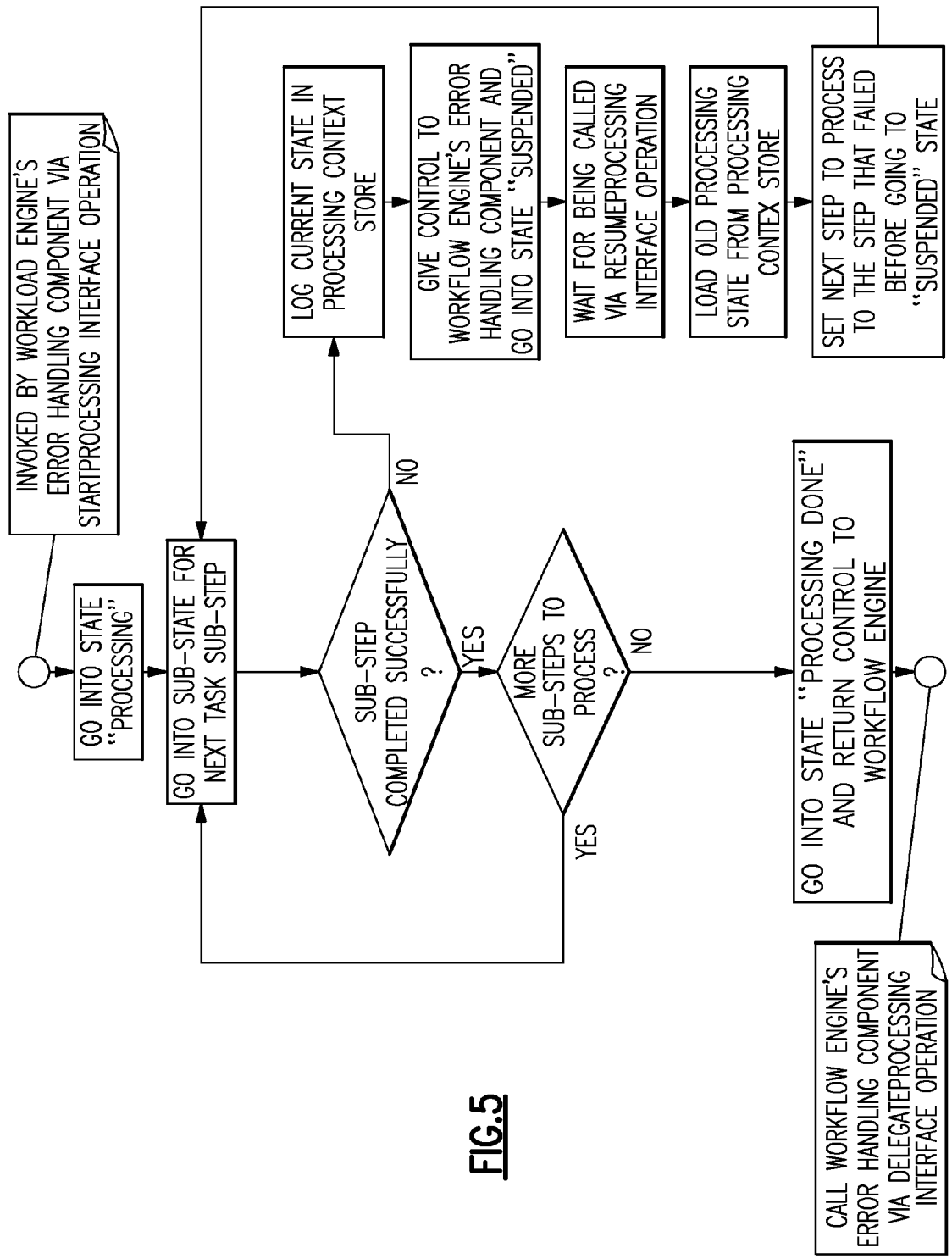
FIG. 5 shows the process flow of the task-provided error handling layer.

Processing flow of the error handling layer (60) is described in more detail with respect to FIGS. 3 and 5. The error handling layer (60) of tasks is an additional layer on top of tasks which is introduced by this invention. It receives invocations from the workflow engines, and via its internal operation and state model adds error handling support to an invoked task. The error handling layer (60) embodies one endpoint of the error handling protocol between the error handling component (40) of a workflow engine and invoked tasks.

Processing within error handling layer (60) follows a state model and—like the error handling component (40) of the workflow engine—uses a processing context store (70) to store processing state information which is necessary in case of errors.

When invoked by the workflow engine via its startProcessing interface operation (62) the error handling layer goes into its normal state "processing" (66) and the actual task (11) starts working. For each substep (16-18) of the actual task, a corresponding substate (67-69) of the error handling layer's processing state exists. Whenever the task starts processing of a certain substep the corresponding processing substate is entered in the error handling layer. Therefore, the developer of the enhanced (error handling capable) task has to define the correct state model for the error handling layer according to the actual task, and has to implement notifications from the actual task to update the error handling layer's state machine whenever a new substep is entered.

Furthermore, for each processing substate (67-69) the error handling layer enters an entry in the processing context store (70) is created. When the respective substate is left (the step is finished), the entry in the processing context store is marked as completed.

When an error occurs in a substep of the actual task the current processing substate of the error handling layer is logged in the processing context store (70). This information is later used for resuming processing of the task at the position where the failure occurred. After writing the entry to the processing context store the error handling layer goes into state "suspended" (65) and hands over control to the workflow engine's error handling component by invoking its suspendProcessing interface operation (44).

The workflow engine's error handling component (40) will then try to resolve the error by means of internal or external error resolving device (33) and than resume processing of the current task by invoking the task's resumeProcessing interface operation (63). When invoked via the resumeProcessing interface operation, the task's error handling layer (70) uses the processing context store (80) to look up the state that existed before going into the suspended state and then resumes processing of the actual task at the substep corresponding to the looked up state. For example, if an error had occurred in substep (17) processing substate (78) would have been written to the processing context store (80). Then on resume, processing substate (78) would be loaded from the processing context store (80) and the actual task would be resumed at the corresponding substep (17).

When all substeps of the task have been processed the task's error handling layer (70) goes into state "processing dose" (64) and gives back control to the workflow engine's error handling component (40) by invoking its delegateProcessing interface (43).

What is claimed is:

1. A method for automated handling of errors in system management flows consisting of system management tasks, wherein the system management tasks are provided by system management applications to perform certain operations on a managed IT infrastructure, wherein the system management tasks provide interfaces via the system management tasks which are invoked during execution of a system management flow definition by a workflow engine, comprising the steps of:
   executing a system management flow definition by the workflow engine, the system management flow not including error handling instructions;
   forming a task invocation in the workflow engine;
   transmitting the task invocation to a system management task; and
   intercepting the task invocation with an error handling component of the workflow engine before the task invocation is provided to the system management task;
   wherein the error handling component uses an error handling interface with an error handling layer for invocation of system management tasks and for error handling, and builds a set of records for the current flow in its processing context store database, wherein the error handling layer uses the processing context store storing processing state information of invoked tasks, and
   wherein the processing context store contains information of each task being invoked including a unique task ID, a system management flow definition ID to which the task belongs, processing state information of the invoked task, wherein the processing state can be "started" or "completed", and information for resuming processing of the invoked task.

2. A method according to claim 1, wherein the error handling component is invoked via an "invoke task" interface.

3. A method according to claim 1, wherein the error handling component performs the steps of:
   invoking a system management task as defined by the task via the system management task's "start processing" operation of the error handling interface by the error handling component and storing processing state information of the invoked task in a processing context store;
   receiving an error condition including a detailed error description via a "suspend processing" operation of the error handling interface from the error handling layer;
   invoking an error resolving device;
   passing the error description to the error resolving device; and
   setting the processing state of the current system management flow to "suspended".

4. A method according to claim 3, wherein the error handling component performs the further steps of:
   invoking a "resume processing" operation of the error handling interface for resuming the previously invoked task; and setting the processing state of the current system management flow to "processing" if the error can be solved and executing the invoked task by the system management application.

5. A method according to claim 3, further including the steps of:
invoking a system management task consisting of subtasks via the "start processing" operation of the error handling interface;
creating for each subtask a processing state in the processing context database by the error handling layer;
logging the current processing state if an error occurs;
setting the processing state of the error handling layer to "suspended"; and
invoking the error handling component via a "suspend processing" operation of the error handling interface wish an error condition.

6. A method according to claim 1, further including the step of:
receiving a non-error condition via a "delegate processing" operation of the error handling interface from the error handling layer if processing is done; and
giving hack control to the workflow engine for continuing execution of a subsequent system management task as defined in the system management flow definition.

7. A system for automated handling of errors in system management flows consisting of system management tasks, wherein the system management tasks are provided by system management applications to perform certain operations on a managed IT infrastructure, wherein the system management tasks provide interfaces via the system management tasks which are invoked during execution of a system management flow definition by a workflow engine, comprising:
means in the workflow engine for forming an invocation of a system management task;
means for intercepting the invocation of a system management task before the invocation is provided to the system management task;
an error handling component coupled to the means for intercepting which uses a processing context store to store processing state information, wherein the error handling component uses an error handling interface with an error handling layer for invocation of system management tasks and for error handling, wherein the error handling layer uses a processing context store storing processing state information of invoked tasks, and wherein the processing context store contains information of each task being invoked including a unique task ID, a system management flow definition ID to which the task belongs, processing state information of the invoked task, wherein the processing state can be "started" or "completed", and information for resuming processing of the invoked task;
means for invoking the error handling component.

8. The system according to claim 7, wherein the error handling component is invoked via an "invoke task" interface.

9. The system according to claim 7, wherein the error handling component includes:
means for invoking a system management task as defined by the task via the system management task's "start processing" operation of the error handling interface by the error handling component and storing processing state information of the invoked task in a processing context store;
means for receiving an error condition including a detailed error description via a "suspend processing" operation of the error handling interface from the error handling layer;
means for invoking an error resolving device;
means for passing an error description to the error resolving device; and
means for setting the processing state of the current system management flow to "suspended".

10. The system according to claim 9, wherein the error handling component further includes: means for invoking a "resume processing operation" of the error handling interface for resuming the previously invoked task; and means for setting the processing state of the current system management flow to "processing" if the error can be solved and executing the invoked task by the system management application.

11. The system according to claim 7, further including means for receiving a non-error condition via a "delegate processing" operation of the error handling interface from the error handling layer if processing is done and for giving back control to the workflow engine for continuing execution of a subsequent task as defined in the system management flow definition.

12. The system according to claim 7, wherein the error handling component is an integral part of the workflow engine.

13. The system according to claim 7, wherein the error handling interface comprises a Web service interface.

14. The system according to claim 7, wherein the error handling layer is part of the system management application for the respective IT infrastructure.

15. The system according to of claim 7, wherein the error resolving device is part of the error handling component.

16. The system according to claim 7, wherein the error resolving device comprises an external device accessible by the error handling component via a communication interface.

17. The system according to claim 7, wherein the error resolving, device comprises a knowledge base including corrective actions for all kinds of errors.

18. The system according to claim 7, wherein the error resolving device comprises an expert system resolving errors based on information passed in the error description and based on knowledge of the failing device and its relationship to other devices.

* * * * *